Patented Mar. 28, 1933

1,903,030

UNITED STATES PATENT OFFICE

ALEX BROOKING DAVIS, OF CINCINNATI, OHIO, ASSIGNOR TO MONSANTO CHEMICAL WORKS, OF ST. LOUIS, MISSOURI, A CORPORATION OF MISSOURI

PROCESS FOR THE MANUFACTURE AND PURIFICATION OF PARANITRANILINE

No Drawing.    Application filed January 18, 1929.   Serial No. 333,528.

My invention relates to the manufacture and purification of paranitraniline and it has particular application to the removal of certain impurities especially those of the diphenylamine class which are formed as by-products and intermediate-products of the synthesis reaction.

Paranitraniline is a common dyestuff and pigment intermediate used extensively in the color trade for producing the so-called para reds. This red pigment is made by treating paranitraniline with nitrous acid, when it is converted into a diazo compound which readily combines with beta naphthol to produce the desired red coloring matter. Of several processes which have been used industrially for the preparation of paranitraniline, one which has proven somewhat difficult of operation, but economically superior, is the so-called autoclave process, which involves heating paranitrochlorbenzol under pressure with ammonia in autoclaves, when paranitraniline is produced according to the following reaction:

$$O_2N-\langle\rangle-Cl + 2NH_4OH \longrightarrow$$
$$O_2N-\langle\rangle-NH_2 + 2H_2O + NH_4Cl$$

When this reaction is carried out there are formed at the same time in almost every instance certain by-products consisting principally of nitrodiphenylamines, of which three are possible of the following formulae and melting points:

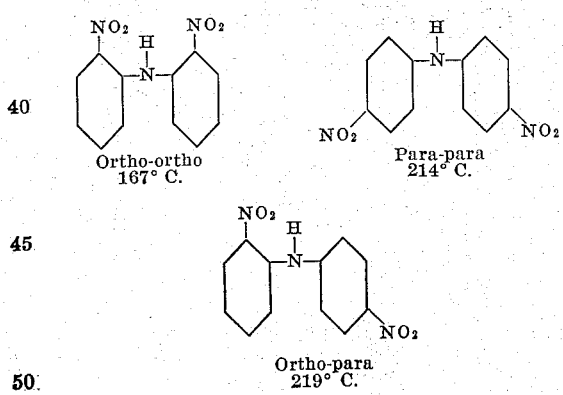

Ortho-ortho 167° C.

Para-para 214° C.

Ortho-para 219° C.

The first of these could be formed from any orthonitrochlorbenzol occurring as an impurity in the principal raw material, paranitrochlorbenzol, the second is formed from the principal raw material and the third by the union of any orthonitrochlorbenzol occurring as an impurity with paranitraniline formed in the action. The reaction which produces these diphenylamines is that which takes place between the nitrochlorbenzol compounds and ortho or paranitraniline, hydrochloric acid being eliminated. Thus paranitrochlorbenzol unites with paranitraniline to produce para-para dinitrodyphenylamines, according to the following reaction:

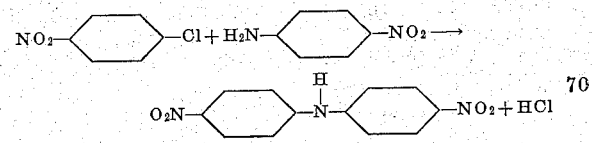

Commercial paranitraniline containing dinitrodiphenylamines in any form as an impurity possesses certain disadvantages and to be of practical application the paranitraniline must be freed as far as possible from these impurities. The importance of this purification is emphasized by U. S. Patent No. 1,673,154 issued to Miller, June 12, 1928, whereby the purification is effected by reduction. The present process is designed to bring about a suitable purification which is much less troublesome and less expensive. It is based upon the fact that the dinitrodiphenylamines possess a tautomeric group and therefore react as acids in the presence of alkalis under proper conditions; thus a dinitrodiphenylamine will form a soluble ammonium salt as follows, due to the tautomeric rearrangement:

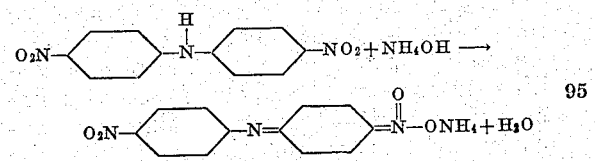

The tautomerism of the dinitrodiphenylamines is not my discovery, but has been described in the literature. It is for instance cited in "Richter's Organic Chemistry, D'Albe, Vol. II, 1922," published by P. Blakiston's Sons & Co., pages 111–112. In that article the statement is made that the dinitrodiphenylamines yield alkali salts the stability of which increases with the number of nitro groups which they contain.

In attempting to remove the dinitrodiphenylamines from autoclave process, paranitraniline, by means of this reaction, I found that very dilute ammonia was better than strong ammonia and only a very small quantity of ammonia was required. In fact the removal of the impurities was not effected so well by a large amount as by only a very small quantity of dilute aqua ammonia, and for the purpose it only becomes necessary to agitate the finely divided crude paranitraniline with the aqua ammonia at a somewhat elevated temperature and filter. In some detail the process may be carried out as follows: 100 parts of paranitraniline is suspended in 500 parts of water, to which has been added 5 parts of ordinary 26° aqua ammonia, and with agitation the suspension is heated either by direct steam, or any other suitable means, to a temperature of 80° C. It is held under continuous agitation at this temperature for about 15 minutes and may then be filtered rapidly thru a press or spun out in a centrifuge. The very dilute ammonia liquor dissolves the principal impurity along with a small amount of paranitraniline, and the resulting paranitraniline, after being washed with water, upon examination is found to have been greatly improved in purity and to give a para red on coupling with beta naphthol, which no longer shows the presence of disturbing quantities of dinitrodiphenylamines. Approximately 5 parts of aqua ammonia per 100 lbs. of paranitraniline are all that is required and either one or two washings, as above described, may be used. All of the ammonia is recoverable by steam distillation and can be used repeatedly.

Evidence of the presence of dinitrodiphenylamine in commercial paranitraniline is shown when the product is diazotized with nitrous acid for the production of para reds, by the fact that the diphenylamine compounds are not diazotized and remain in suspension as a yellowish flocculent matter, which spoils the resulting color, tending to make the undertone yellow when the product is rubbed up in oil, and also to some extent, to mask the density of shade, causing the product to appear weak in color strength. The improvement of commercial paranitraniline, treated by the above process, is immediately evident by the lessening, or elimination, of the flocculent material otherwise apparent in the diazo solution, which from perfectly pure paranitraniline is practically clear, and in the greatly improved strength and tone of the resulting color when the diazo solutions are coupled with beta naphthol.

I am aware that paranitraniline is in a measure subjected to the effects herein described when the autoclaves are discharged, for the contents of the autoclave consists of aqua ammonia bearing ammonium chloride in solution and molten paranitraniline, which immediately solidifies when the autoclave charges are blown into water. However, the presence of the very large amounts of ammonia and ammonium chloride do not have the desired effect of dissolving diphenylamine impurities, and it appears that only by a subsequent washing with hot, fairly dilute ammonia can the impurities be removed satisfactorily, and it is that portion of the process detail which I desire to cover by Letters Patent. I have, however, found that while the dilute solutions of ammonia are superior for carrying out this purification, the washing can be carried out at temperatures higher and lower than 80° C. and with strengths of ammonia which may vary considerably and with the use of either open or closed vessels and under pressure or not, and I do not therefore restrict myself to the exact conditions under which this subsequent washing may be carried out. Other alkalis than ammonia in proper concentration are found satisfactory when they are not used in a strength sufficiently great, or of a character so active as to decompose the paranitraniline into paramidophenols, thereby introducing other impurities into the product. The process therefore can be used with other basic materials than ammonia as the purifying agent.

Now having described my invention, what I claim is:

1. The process of removing dinitrodiphenylamines from commercial paranitraniline by dissolving the diphenylamine compounds out with hot aqua ammonia of approximately 1% ammonia strength.

2. In the process of manufacturing paranitraniline from paranitrochlorbenzol, the process step of subjecting the paranitraniline after removal from the autoclave to one or more washings with dilute aqua ammonia of approximately 1% strength.

In testimony whereof I affix my signature.

ALEX BROOKING DAVIS.